United States Patent [19]

Hansen

[11] 4,023,673
[45] May 17, 1977

[54] CONVEYOR DROP STRUCTURE
[75] Inventor: Glen D. Hansen, Maple Plain, Minn.
[73] Assignee: VEDA, Inc., Long Lake, Minn.
[22] Filed: Jan. 22, 1976
[21] Appl. No.: 651,298
[52] U.S. Cl. .............................. 198/735; 198/370; 198/494; 198/530; 198/533
[51] Int. Cl.² .................................... B65G 47/34
[58] Field of Search ............... 198/59, 60, 61, 65, 198/66, 67, 169, 205, 229, 370, 494, 526, 529, 530, 533, 631, 735

[56] References Cited
UNITED STATES PATENTS

| | | | |
|---|---|---|---|
| 1,898,134 | 2/1933 | Linder | 198/229 |
| 2,008,572 | 7/1935 | White | 198/65 |
| 2,487,693 | 11/1949 | Canon | 198/65 |
| 2,776,740 | 1/1957 | Claessen | 198/229 X |
| 3,043,420 | 7/1962 | Kelly | 198/65 X |
| 3,159,142 | 12/1964 | Bares et al. | 198/229 X |
| 3,220,540 | 11/1965 | Frontczak | 198/229 |
| 3,774,751 | 11/1973 | Bakker | 198/169 |
| 3,828,919 | 8/1974 | Holtsclaw et al. | 198/66 X |

FOREIGN PATENTS OR APPLICATIONS 678,564  9/1952  United Kingdom ............... 198/229

Primary Examiner—John J. Love
Assistant Examiner—Richard K. Thomson
Attorney, Agent, or Firm—Burd, Braddock & Bartz

[57] ABSTRACT

An endless single chain conveyor for moving bulk material to separate selective locations. The conveyor has a dropout section including a sliding door movable to an open position to allow material to drop from the conveyor intermediate the ends of the conveyor. Shaker structure movable to an operable position when the door is in its open position has a roller engageable with the chain of the conveyor so that the chain repetitively moves up and down as it rides over the roller so that the material carried by the conveyor will fall through the discharge opening of the dropout section of the conveyor.

35 Claims, 6 Drawing Figures

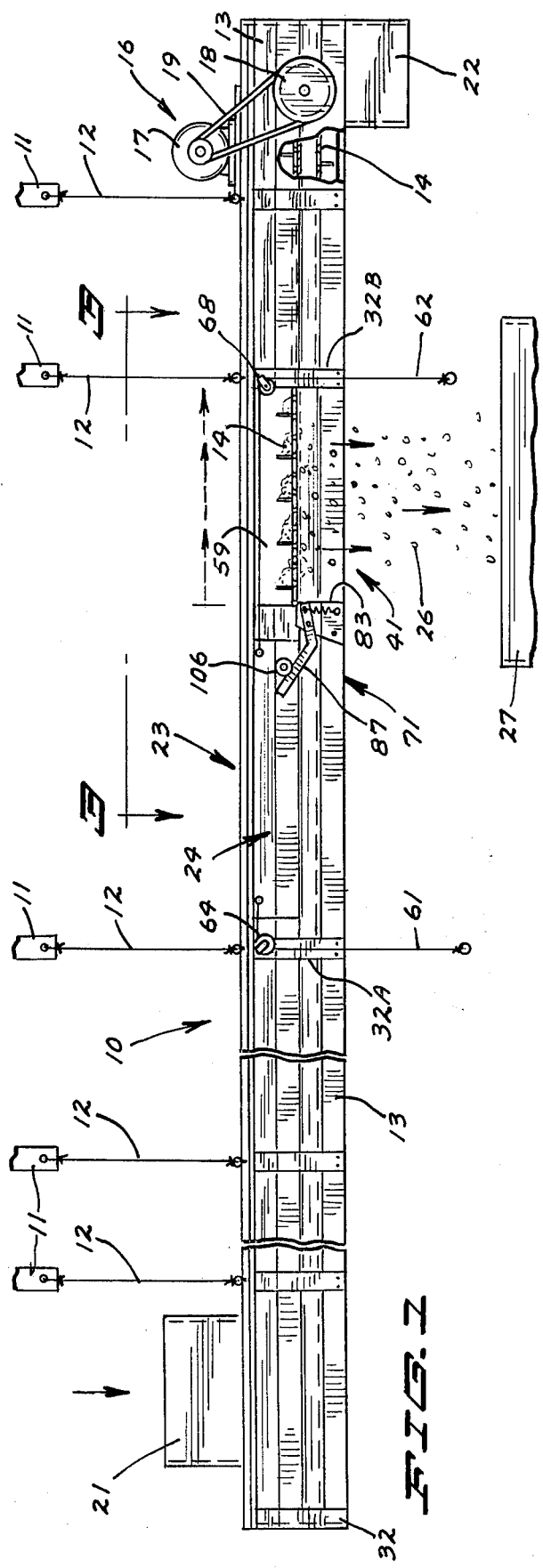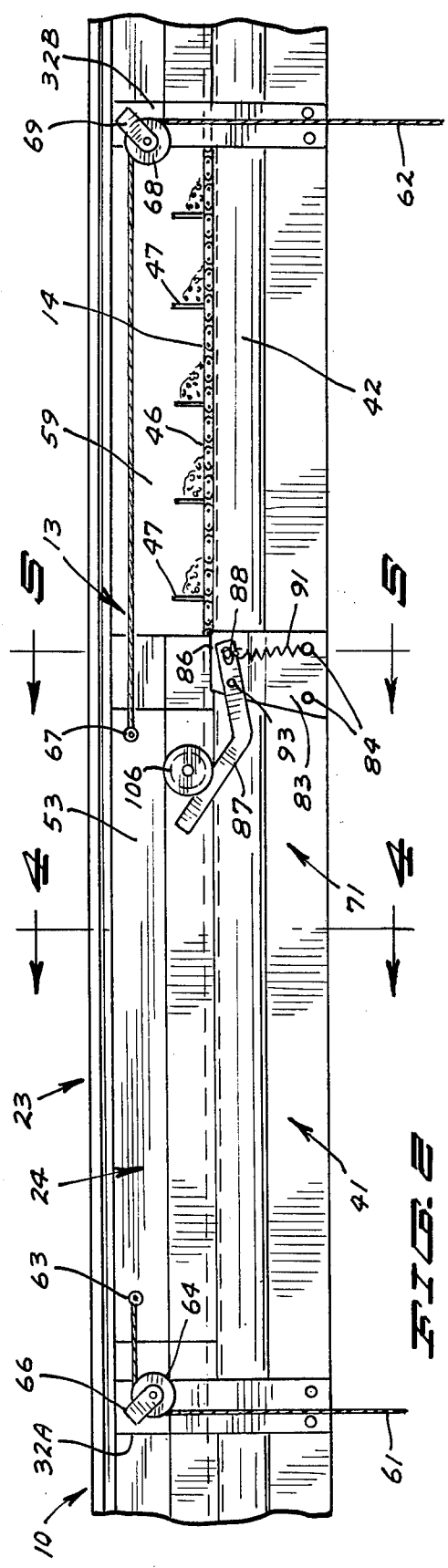

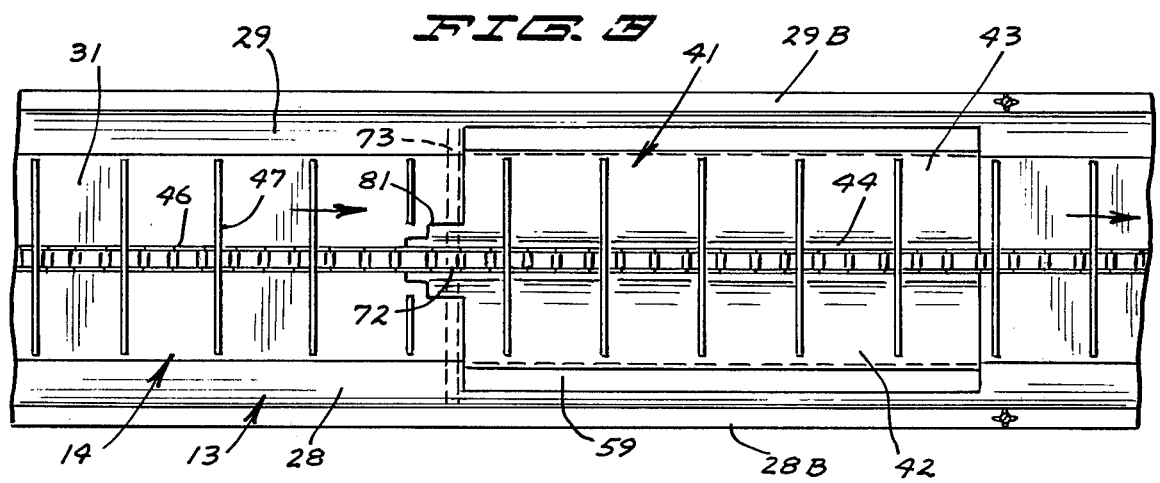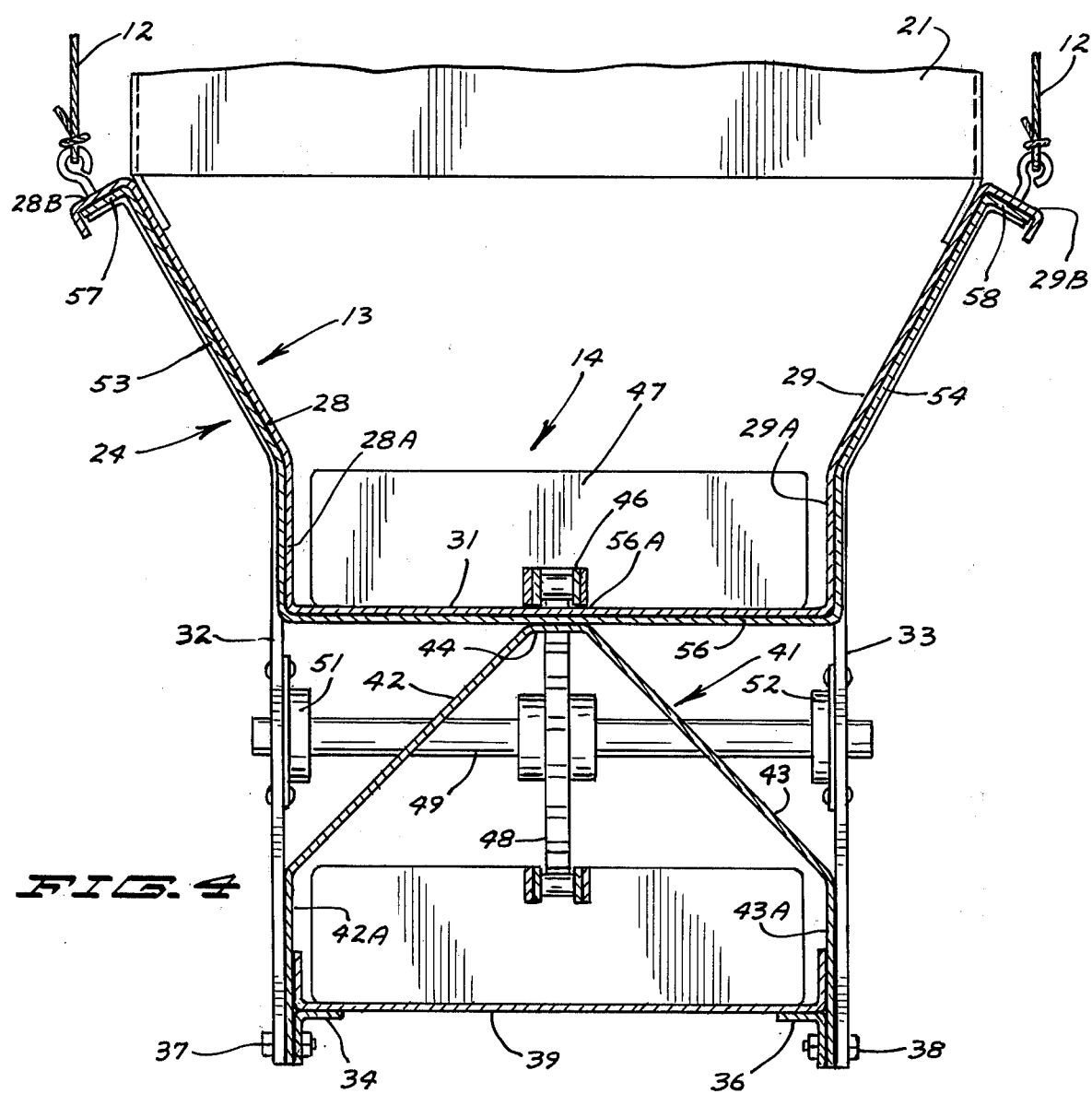

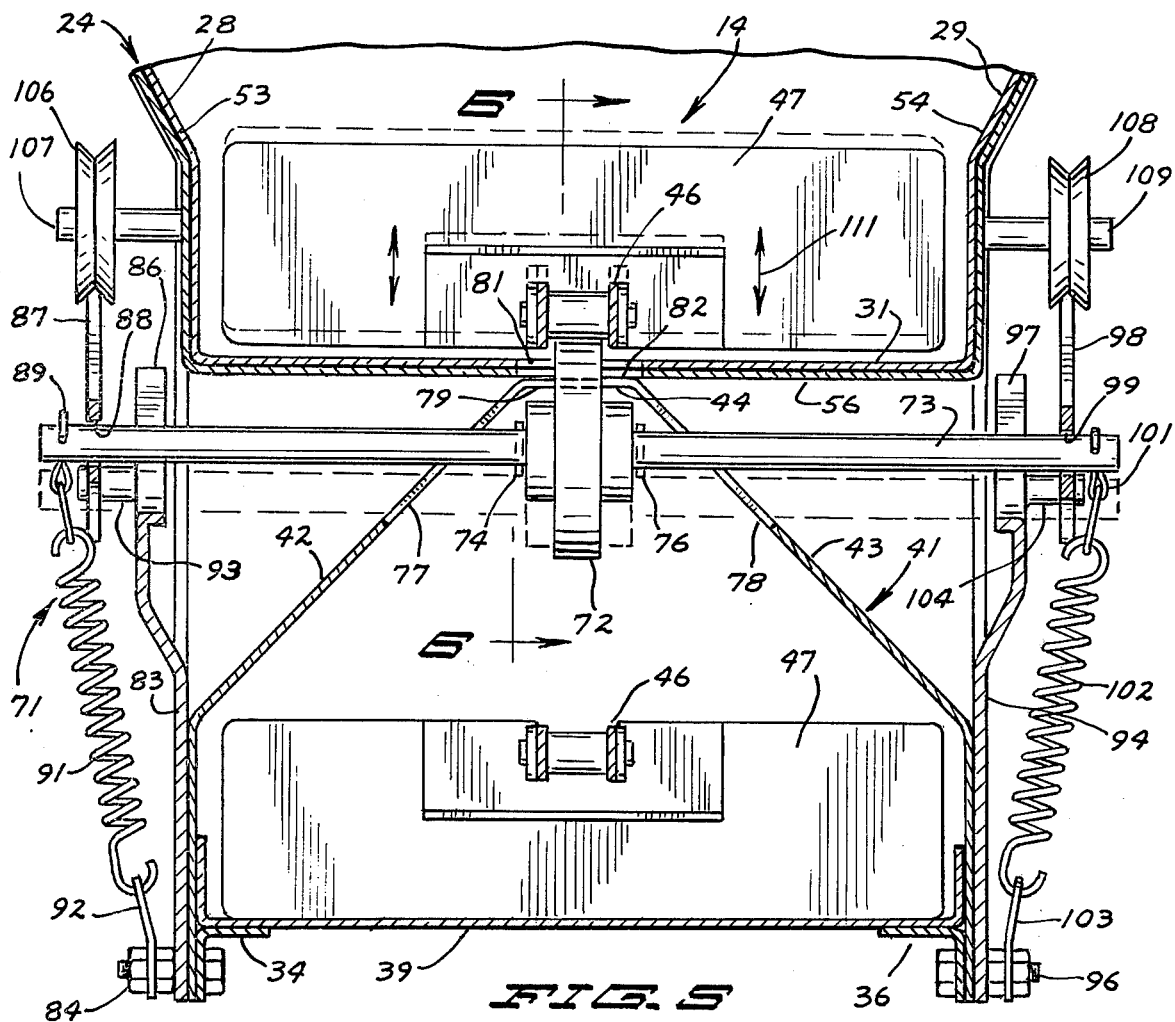
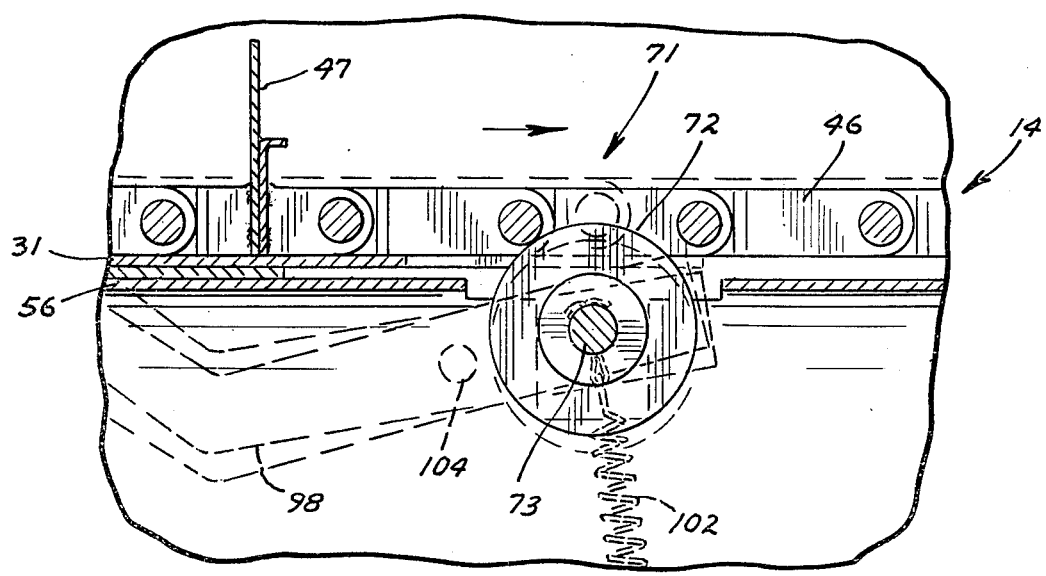

CONVEYOR DROP STRUCTURE

BACKGROUND OF THE INVENTION

Trough conveyors having augers or chains for moving bulk material have been provided with bottom openings to allow the bulk material to drop from the conveyor to a desired location. Movable gates are used to open and close the openings in the conveyor. Structures, as sprocket and chain racks, operate to move the gates. Herzog et al. in U.S. Pat. No. 3,351,180 show an example of a trough conveyor having a sliding bottom gate. A single drag chain conveyor having an intermediate dropout section is described by Bakker in U.S. Pat. No. 3,774,751. These conveyors with their dropout sections are usable with dry granular bulk materials which do not have a tendency to stick to the flights of the moving conveyor. When these conveyors are used to handle livestock feeds, as silage, haylage, pelletized hay and similar fibrous bulk materials, the material does not effectively fall through the conveyor when the bottom gate is in the open position. These materials have a tendency to stick together and hang onto the flights so that all of the material does not fall through the dropout section. The material dropout section of the invention is operable to overcome these disadvantages.

SUMMARY OF THE INVENTION

The invention is directed to a material dropout section for a material conveyor that is operable to discharge material to a selected location. The dropout section has a U-shaped trough formed with an outlet opening. A door movably mounted on the trough is operable to selectively open and close the opening. The bulk material is moved throughout the dropout section with an endless chain conveyor. The endless chain conveyor has a link chain and transverse flights secured to the chain. The dropout section is equipped with chain shaker structure that is moved into operative engagement with the chain when the door is in the open position. The shaker structure comprises a roller engageable with the chain. As the chain rides over the roller, the chain and flights attached to the chain vibrate, or repetitively move up and down, so that any bulk material carried by the chain and transverse flights is shaken from the chain and discharged through the opening of the trough. When the door is moved to the closed position, the roller moves out of engagement with the chain so that the chain is free to carry the bulk material through the dropout section.

An object of the invention is to provide a dropout section for a trough conveyor that has a conveyor shaker structure operable to insure that the conveyed material will fall from the dropout section. Another object of the invention is to provide shaker structure for a dropout section of a conveyor having a movable gate that is operable when the gate is in its open position. A further object of the invention is to provide a conveyor having an endless chain with a shaker structure having a roller engageable with the chain so that on movement of the chain over the roller, the chain is repetitively moved up and down to dislodge any material from the chain and flights attached thereto. Yet another object of the invention is to provide a dropout section for a single conveyor with a movable door that is mounted on the trough of the conveyor and a divider so that the door can be manually moved between its open and closed positions. A still further object of the invention is to provide a dropout section for an endless conveyor that is operable to discharge bulky, fibrous materials that have a tendency to stick together and to the conveying structure. A further object of the invention is to provide shaker structure for a drop section of a conveyor that is effective in use, economical to manufacture, requires little maintenance, and can be readily cleaned and repaired. These and other objects and advantages of the invention are found in the following description.

IN THE DRAWINGS

FIG. 1 is a foreshortened conveyor assembly having the material dropout section of the invention;

FIG. 2 is an enlarged side elevational view of the material dropout section of the invention;

FIG. 3 is an enlarged top plan view of the material dropout section of FIG. 1 viewing downwardly along line 3—3 of FIG. 1;

FIG. 4 is an enlarged sectional view taken along line 4—4 of FIG. 2;

FIG. 5 is an enlarged sectional view taken along line 5—5 of FIG. 2; and

FIG. 6 is a sectional view taken along line 6—6 of FIG. 5.

DESCRIPTION OF PREFERRED EMBODIMENT

Referring to FIG. 1, there is shown a conveyor assembly indicated generally at 10 for moving bulk material, as grain, feed ensilage, haylage and like livestock feeds, to selected locations. The conveyor assembly 10 is suspended from a plurality of supports 11 by generally upright suspension members 12, as bars, straps or cables. The suspension members 12 are connected to the supports 11 and to the conveyor assembly 10 with conventional fasteners, as nuts and bolts. Other types of support structures, as support legs and frame members, can be used to support the conveyor assembly 10 in a generally horizontal position. Conveyor assembly 10 can be located in an inclined position so that the material is elevated as it moves along the conveyor assembly.

Conveyor assembly 10 comprises an elongated generally U-shaped trough 13 carrying an endless conveyor 14. The endless conveyor 14 is moved relative to trough 13 by a drive unit indicated generally at 16. Drive unit 16 comprises an electric motor 17 mounted on top of one end of trough 13. A pulley 18 connected to the drive shaft for the endless conveyor is driven via an endless belt 19 by the motor 17. Other types of drives structures can be used to move the endless conveyor 14.

A material receiver or hopper 21 is mounted on top of one end of trough 13 to receive material and direct the material into the trough 13 and onto the endless conveyor 14. Conveyor 14 moves the material from the hopper 21 to an out chute 22 which directs the material to a first selected location, such as a bunk feeder. For example, the chute 22 can direct the material to a bunk feeder as shown in U.S. Pat. No. 3,902,592.

The conveyor assembly 10 is comprised of a plurality of end-to-end conveyor units or sections. One of the sections is a material dropout section indicated generally at 23. This section has a movable gate or door 24 that can be moved to an open position, as shown in FIG. 1, so that the material 26 can drop from the conveyor 14 into a container 27. The container 27 can be the box of a trailer or truck, a self-unloading wagon, or a hopper for another conveyor or bunk feeder. Door 24 is movable from the open position to a closed position wherein the material moves through the dropout section 23 and is carried by the conveyor 24 to the out chute 22.

Referring to FIG. 4, trough 13 is a generally U-shaped elongated member having a first upwardly and outwardly directed side wall 28 and a second upwardly and outwardly directed side wall 29. The bottom portions of the side walls 28 and 29 have vertical sections 28A and 29A, respectively, joined to a horizontal bottom wall 31. The upper ends of side walls 28 and 29 have outwardly directed generally L-shaped flanges 28B and 29B, respectively.

Splice plates 32 and 33 secured to the side walls 28 and 29 with conventional fastening means, as nuts and bolts, hold adjacent sections in relative end-to-end positions. The splice plates 32 and 33 extend downwardly from the side walls 28 and 29 below the bottom wall 31. A first angle member 34 is located adjacent the inside of splice plate 32. Nut and bolt assemblies 37 secure the angle member 34 to the splice plate. A second angle member 36 is secured to the inside of splice plate 33 with a nut and bolt assembly 38. A floor or bottom pan 39 is supported by the angle members 34 and 36.

An elongated horizontal deflector or divider indicated generally at 41 is located between the splice plates 32 and 33 below the bottom wall 31. Deflector 41 has elongated side walls 42 and 43. The side walls 42 and 43 are angularly disposed with respect to each other and converge in an upward direction. The upper edges of side walls 42 and 43 are integral with a generally horizontal apex or longitudinal top center section 44. The lower sections 42A and 43A of side walls 42 and 43 extend downwardly adjacent the opposite sides of the bottom wall 39 and are secured to the angle members 34 and 36 with nut and bolt assemblies, as nut and bolt assemblies 37 and 38. The opposite sides or flanges 39A and 39B of pan 39 are attached to sections 42A and 43A with fasteners, as nuts and bolts (not shown).

Endless conveyor 14 has a single link chain 46 extended longitudinally along the center of the bottom wall 31. As shown in FIG. 3, a plurality of upright transverse flights 47 are secured to the chain 46. The flights 47 extend substantially the full transverse width of the lower portion of the trough 13 and thereby function to carry the material along trough 13 when the conveyor 14 is moving. Chain 46 is trained about an idler sprocket 48. Sprocket 48 is secured to a transverse shaft 49. Opposite ends of shaft 49 are rotatably supported on bearings 51 and 52 secured to the splice plates 32 and 33. The opposite end of chain 46 is trained about a similar sprocket. The drive shaft for the sprockets is attached to pulley 18, shown in FIG. 1.

Returning to FIG. 4, door 24 is a generally U-shaped member that fits under the trough 13. Door 24 has side walls 53 and 54 and a bottom wall 56. The upper edge of side wall 53 terminates in an outwardly directed flange 57 located in the channel formed by the lip 28B. The upper edge of side wall 54 has an outwardly directed flange 58 located in the channel formed by lip 29B. The longitudinal center porton 56A of bottom wall 56 is supported by and rides on the apex portion 44 of the divider 41. Door 24 is slidably mounted for movement in a longitudinal direction relative to trough 13 to selectively open and close an opening 59 in the trough. As shown in FIG. 3, the opening 59 has a general rectangular shape. The side walls 28 and 29 as well as bottom wall 31 of the trough 13 have been cut away to thereby expose the top of divider 41. The material carried by the conveyor 14 will fall from the conveyor onto the divider 41 when the door 24 is open. The divider 41 separates the material 26 into two parts and protects the lower run of conveyor 14 as it is located in the elongated enclosure or chamber under walls 42 and 43.

The door 24 is manually moved between its open and closed positions. As shown in FIG. 2, a pair of cables 61 and 62 connected to the door 24 are used to selectively open and close the door 24. Cable 61 is pulled to open the door while cable 62 is pulled to close the door 24. Cable 61 is anchored to the side wall 53 with a fastener 63, such as a nut and bolt assembly. The cable 61 is trained over a pulley 64 secured with a bracket 66 to the upper part of a splice plate 32A. The cable 61 extends under the divider 41 and through a pulley similar to pulley 64 secured to the splice bracket on the opposite side of the trough 14. The opposite end of cable 61 is secured to the side wall 54. The cable 62 is fastened to the forward end of side wall 63 with a fastener 67, as a nut and bolt assembly. Cable 62 extends from fastener 67 over a pulley 68. A bracket 69 rotatably mounts the pulley 68 on the upper end of a splice plate 32B. The splice plate 32B connects the material dropout section 23 with the next section of the conveyor assembly 10. The cable 62 extends under the divider 41 and is trained over a pulley connected to the splice plate on the opposite side of the trough 13. The opposite end of the cable is secured to the side wall 54 so that when the cable 62 is pulled, forces are applied to both side walls 53 and 54 so that the door 24 is free to slide on the deflector 41 and the lips 28B and 29B of the trough 13.

The material dropout section 23 has shaker structure or means to shake or repetitively move the top run of endless conveyor 14 up and down indicated generally at 71. Shaker structure 71 operates to vibrate the upper run of the endless conveyor 14 as the conveyor moves through the opening 59 so that all of the material positioned between and on adjacent flights 47 and chain 46 falls toward deflector 41.

As shown in FIG. 5, shaker structure 71 has a roller 72 rotatably mounted on a transverse rod 73. Pins 74 and 76 extend through rod 73 and locate the roller 72 in the midsection of trough 13. Roller 72 projects upwardly through a hole 79 in the top portion of deflector 41. The bottom wall 31 has an opening or cutout 71 aligned with an opening or cutout 82 in the bottom wall 56 of door 24. The openings 81 and 82 are aligned with each other when the door 24 is in the open position, as shown in FIG. 5. When the door is in the closed position, the openings 81 and 82 are closed by the bottom walls 31 and 56. One end of rod 73 is movably mounted on a bracket 83. The lower end of bracket 83 is secured to the divider 41 and angle member 34 with bolts 84. The upper end of bracket 83 has an upwardly open slot 86 accommodating an end of rod 73. A cotter pin 89 extends through a suitable hole in the end of rod 73 and is connected to a tension spring 91. The lower end of tension spring 91 is hooked to a clip 92. Clip 92 is connected to the bolt 84 with a suitable nut. A lever 87 has a slot 88 for accommodating one end of the rod 73. A pivot member 93 pivotally mounts the lever 87 on bracket 83 so that the lever 87 will move the rod 73 in an upward or raised operating position and a lower or park position. The spring 91 biases the lever in a clockwise direction to move the rod 73 to its lower or park position.

A second bracket 94 is secured to the opposite side of divider 41 with bolts 96. Bracket 94 has an upwardly open slot 97 accommodating an end of rod 73. A lever 98 has an elongated slot 99 accommodating the end of rod 73. A cotter pin 101 extends through a suitable hole in the end of rod 73 adjacent lever 98. A spring 102 is connected to the cotter pin 101 and a clip 103. The clip 103 is secured to the bolt 96 with a suitable nut whereby the spring biases the rod 73 in the downward direction to the park position. An outwardly directed pivot member 104 pivotally mounts the lever 98 on the bracket 94.

As shown in FIG. 2, the lever 87 has an angular configuration. The outer or free end of the lever 87 extends at about 45° with respect to the forward or pivoted end of the lever. The lever 98 has the same shape. The free end of lever 87 extends upwardly and engages a wheel or roller 106. Wheel 106 is rotatably mounted on an axle 107 secured to the side wall 53 of the door 24. As shown in FIG. 5, wheel 106 has a V-groove in its outer peripheral surface to accommodate and hold the lever 87 in alignment and engagement with wheel 106. The lever 98 engages a wheel 108. Wheel 108 is rotatably mounted on an axle 109 secured to the side wall 54 of door 24. Wheel 108 has the same V-shaped outer peripheral aligned with and engages the V-shaped groove in the wheel 108.

In use, when door 24 is in the open position, as shown in FIGS. 1 and 2, the levers 87 and 98 are engaged by the wheels 106 and 108. The wheels 106 and 108 pivot the levers 87 and 98 in a counterclockwise direction about their respective pivot members 93 and 104. The forward ends of the levers 87 and 98 move upwardly and thereby move rod 73 in its raised or actuating position. When the door 24 is in the open position, the openings 81 and 82 are aligned with each other, permitting the roller 72 to project through openings 81 and 82 and above the top surface of the bottom wall 31. As shown in FIG. 5, the roller 72 is in longitudinal alignment with chain 46 so that when the roller 72 is in its up or raised position, it raises the chain 46 above the top surface of bottom wall 31. The chain 46 comprises side links and cross members so that as the chain is moved in the longitudinal direction, the cross links ride over the roller 72. This causes the chain to shake or vibrate in up and down directions, as indiated by arrows 111 and full and broken lines in FIGS. 5 and 6. The shaking or vibrating action on the chain 46 also vibrates the flights 47. As the flights 47 and chain 46 move the material through the opening 59, the vibrating chain 46 and flights 47 shake the material from the chain and flights with the result that all of the material falls onto the deflector 41 and into the container 27.

When the door 24 is moved to its closed position by pulling on the cable 62, the wheels 106 and 108 are moved to the right away from the levers 87 and 98. The spring 91 and 102 bias the rod 73 as well as the levers 87 and 98 to their inoperative or park position. The rod 73 moves to the bottom of the slots 86 and 87 in the brackets 83 and 94, respectively. This lowers the roller 72 below the bottom wall 56 of the door 24. The roller 72 thus does not interfere with the movement of the door 24 to the closed position. The continued operation of the conveyor assembly 10 with the door 24 closed will carry the material to the discharge end or right end, as shown in FIG. 1. The material is discharged in a downward direction through the outlet chute 22.

While there has been shown and described a preferred embodiment of the material dropout section for a conveyor assembly, it is understod that changes in size, materials, parts and configurations may be made by those skilled in the art without departing from the invention. Furthermore, the dropout section is usable in conveyors operable to carry bulk materials other than livestock feeds.

The embodiments of the invention in which an exclusive property or privilege is claimed are defined as follows:

1. A material dropout section for a material conveyor having conveyor means to move material along the conveyor comprising: trough means having a material discharge opening, said conveying means being located in said trough means and movable relative thereto to move material along said trough means, a door movable relative to the trough means to open and close positions to selectively open and close the material discharge opening, and means engageable with the conveying means for causing up and down movements of the conveying means on movement of the conveying means relative to the trough means when the door is in its open position whereby material carried by the conveying means is discharged through the discharge opening, said means engageable with the conveying means including a first means movable to a first position in engagement with the conveying means when the door is in the open position and movable to a second position out of engagement with the conveying means when the door is in the closed position, and second means connected to the first means and cooperating with the door to move the first means to the first position when the door is in the open position and allowing the first means to move to the second position when the door is in the closed position.

2. The section of claim 1 wherein: the conveying means is an endless link chain and transverse flights are secured to the chain, said first means engageable with the conveying means including a roller engageable with the chain, said second means including means for mounting the roller on the section, and means engageable with the door when the door is in its open position to hold the roller in a position where it is engaged by the chain.

3. The section of claim 1 wherein: the trough means includes a member having an elongated bottom wall and generally upright side walls, said door having an elongated bottom wall and generally upright side walls located adjacent the bottom wall and side walls of the trough means, said trough means and door having elongated coacting means to slidably mount the door on the trough means.

4. The section of claim 1 wherein: the trough means has elongated generally horizontal lips having channels, said door having elongated flanges located in the channels whereby the door is guided for generally horizontal movement between its open and closed positions by the lips.

5. The section of claim 1 including: elongated divider means located below the trough means, said divider means having an elongated top section, said conveying means engageable with the top section when the second member is in the open position.

6. The section of claim 1 including: support means secured to the trough means, said first means engageable with the conveying means including a member movable to an operating first position wherein the conveying means engages the member and movable to a park second position wherein the member is separated from the conveying means, said second means including means mounting the member on the support means, and means operable in response to movement of the door to the open position to move the member to its operating position.

7. The section of claim 6 wherein: the member engageable with the conveying means is a roller.

8. Material dropout section for a material conveyor having conveying means to move material along the conveyor comprising: trough means having a material discharge opening, said conveying means being located in said trough means and movable relative thereto to move materials along said trough means, a door movable relative to the trough means to open and closed positions to selectively open and close the material discharge opening, means engageable with a conveying means for causing up and down movements of the conveying means on movement of the conveying means relative to the trough means when the door is in its opened position whereby material carried by the conveying means is discharged through the discharge opening, support means secured to the trough means, said means engageable with the conveying means including a member movable to an operating position wherein the conveying means engages the member and movable to a park position wherein the member is separated from the conveying means, means mounting the member on the support means, means operable in response to movement of the door to the open position to move the member in its operating position, said member is a roller, said means mounting the member is a transverse rod, said means operable in response to movement of the door to the open position to move the member to its operating position is lever means pivotally mounted on the support and connected to the rod, and means on the door engageable with the lever means when the door is in the open position to pivot the lever means in a direction to move the roller to the operating position relative to the conveying means.

9. The section of claim 8 wherein: said lever means comprise a pair of levers located adjacent opposite sides of the door.

10. The section of claim 8 wherein: the means on the door engageable with the lever means includes a wheel rotatably mounted on the door.

11. The section of claim 8 including: biasing means connected to the rod to bias the rod and roller to the park position.

12. An apparatus for shaking a chain conveyor moving along a trough having a discharge opening and a door movable relative to the trough to a closed positon to close the opening and to an open position to open the opening comprising: a member located below the chain conveyor and movable to a first position to engage the chain conveyor and movable to a second position out of engagement with the chain conveyor, and means connected to the member and movable in response to movement of the door to the open position to move the member to said first position whereby on movement of the chain conveyor the chain conveyor repetitively moves up and down over the member, said means allowing the member to move from the first position to the second position when the door is in the closed position.

13. The apparatus of claim 12 wherein: the member is a roller and the means connected to the member has structure for carrying the roller.

14. The apparatus of claim 12 wherein: the means connected to the member includes lever means movable to raise and lower the member, and means on the door engageable with the lever means when the door is in the open position to move the lever means to raise the member.

15. The apparatus of claim 14 wherein: the means connected to the member includes a rod, said member being mounted on the rod, said lever means being attached to the rod, and biasing means for biasing the rod and member to the lower position.

16. The apparatus of claim 15 wherein: the member is a roller rotatably mounted on the rod.

17. The apparatus of claim 15 including: stationary brackets having upwardly open slots accommodating parts of the rod whereby the rod can be raised and lowered and pivot means mounting the lever means on the brackets.

18. The apparatus of claim 14 wherein: the lever means includes a pair of levers located adjacent opposite sides of the door, said means on the door including wheel engageable with the levers when the door is in the open position.

19. A material dropout section for a material conveyor having conveying means including a moving chain comprising: a trough having a bottom material discharge opening, a door movably mounted on the trough for selective movement to an open position and a closed position to open and close the opening, said conveying means located in said trough to move material along the trough, shaker structure engageable with the chain to cause repetitive up and down movements of the chain, said shaker structure comprising a roller engageable with the chain, a transverse rod carrying said roller, lever means attached to the rod, fixed bracket means supporting the lever means and pivot means pivotally mounting the lever means on the bracket means whereby pivotal movement of the lever means raises or lowers the rod and roller, biasing means to bias the lever means in the direction to hold the rod and roller in a lowered position, means mounted on the door engageable with the lever means when the door is in the open position to pivot the lever means to its raised position to hold the rod and roller in a raised position so that the chain as it moves over the roller will repetitively move up and down causing the material to fall from the conveying means through the material discharge opening.

20. The section of claim 19 where: said trough has a bottom wall having an opening for accommodating the roller, said door having an opening aligned with the opening in the bottom wall when the door is in its open position.

21. The section of claim 19 including: divider means located below said discharge opening to deflect material discharged through the opening, said divider means having downwardly diverging side walls and an elongated top section having an opening, said roller having a portion extended through the opening in the top section when moved to its raised position.

22. The section of claim 19 wherein: the means mounted on the door includes a wheel engageable with the lever means when the door is in the open position.

23. The section of claim 19 wherein: the lever means comprise a first lever attached to one end of the rod and a second lever attached to the other end of the rod, said means mounted on the door including a first wheel engageable with the first lever and a second wheel engageable with the second lever.

24. An apparatus for shaking conveying means moving along conveyor structure having a bottom material discharge opening comprising: a member located below the conveying means and movable to a first position to engage the conveying means whereby on movement of the conveying means relative to the member the conveying means repetitively moves up and down so that material carried by the conveying means falls from the conveying means through the material discharge opening, means mounting the member on the conveyor structure, a door movably mounted on the conveyor structure, said door being movable to a first position to close the material discharge opening and movable to a second position to open the material discharge opening, and means operable in response to movement of the door to the open position to move the member to the first position, said latter means also operable to move the member to a second position out of engagement with the conveying means when the door is moved from the open position to the closed position.

25. The apparatus of claim 24 wherein: the latter means includes biasing means operable to move the member to a second position out of engagement with the conveying means.

26. The apparatus of claim 24 wherein: the conveyor has a link chain and said member is a roller engageable with the link chain.

27. The apparatus of claim 24 wherein: the means operable in response to movement of the door includes lever means connected to the member, and means on the door engageable with the lever means whereby the door means the lever means when the door is moved to the second position.

28. The apparatus of claim 24 wherein: the conveying means includes a link chain engageable with the member.

29. In combination: a support having a surface and a material discharge opening allowing material to fall from the support, conveying means located on said surface for moving material along said surface to the discharge opening, said conveying means having a chain and transverse members secured to the chain, said chain having links with longitudinally spaced transverse members, a roller located below the chain engageable with the transverse members, and means connected to the roller to locate the roller in a first position to raise the chain above said surface when a transverse member moves over the roller and allowing the chain to engage the surface when the roller is located between adjacent transverse members whereby the conveying means shakes as the transverse members move over the roller, said latter means operable to locate the roller in a second position wherein the roller does not engage the chain.

30. The structure of claim 29 wherein: the means connected to the roller includes a shaft rotatably carrying the roller and lever means connected to the shaft movable to selectively move the roller to the first and second positions.

31. The structure of claim 29 including: a door movably mounted on the support for movement to a first position closing the discharge opening and to a second position opening the discharge opening.

32. The structure of claim 29 including: elongated means extended longitudinally along the discharge opening, said chain riding on said means as it moves over the discharge opening.

33. An apparatus for shaking conveying means having a longitudinal chain comprising a plurality of links having longitudinally spaced cross members, said conveying means adapted to move along conveyor structure having a bottom material discharge opening comprising: a member located below the chain and means mounting the member for movement to a first position to engage the cross members of the chain whereby on movement of the chain relative to the member the cross members ride over the member so that the conveying means repetitively moves up and down to and out of engagement with the conveyor structure whereby material carried by the conveying means falls from the conveying means through the material discharge opening, said means mounting the member operable to move the member to a second position out of engagement with the chain.

34. The structure of claim 33 wherein: the means connected to the member includes a shaft carrying the member and a lever means connected to the shaft movable to selectively move the member to its first and second positions.

35. The structure of claim 33 including: a door movably mounted on the conveyor structure for movement to a first position closing the discharge opening and to a second position opening the discharge opening, said means for mounting the member being movable in response to movement of the door to the open position to move the member to the first position and operable on movement of the door to the closed position to move the member to the second position out of engagement with the chain.

* * * * *

UNITED STATES PATENT AND TRADEMARK OFFICE
CERTIFICATE OF CORRECTION

PATENT NO. : 4,023,673
DATED : May 17, 1977
INVENTOR(S) : GLEN D. HANSEN

It is certified that error appears in the above-identified patent and that said Letters Patent are hereby corrected as shown below:

Column 1, line 36, "throughout" should be -- through --.

Column 1, line 66, after "single" insert -- chain --.

Column 4, line 51, after "portion" insert -- 44 --.

Column 4, line 52, "71" should be -- 81 --.

Column 5, line 31, after "peripheral" insert -- surface as the wheel 106. The outer end of the lever 98 is --.

Column 5, line 51, "indiated" should be -- indicated --.

Column 6, line 8, "understod" should be -- understood --.

Column 6, line 18 "conveyor" should be -- conveying --.

Column 7, line 38, "in" should be -- to --.

Column 7, line 59, "positon" should be -- position --.

Column 8, line 56, "where" should be -- wherein --.

UNITED STATES PATENT OFFICE
CERTIFICATE OF CORRECTION

Patent No. 4,023,673　　　　　　　Dated May 17, 1977

Inventor(s) Glen D. Hansen

It is certified that error appears in the above-identified patent and that said Letters Patent are hereby corrected as shown below:

Column 9, line 42, "means", first occurrence, should be -- moves --.

Signed and Sealed this

Fourth Day of October 1977

[SEAL]

Attest:

RUTH C. MASON
Attesting Officer

LUTRELLE F. PARKER
Acting Commissioner of Patents and Trademarks